United States Patent
Hillingrathner

[15] 3,667,317
[45] June 6, 1972

[54] BALANCER
[72] Inventor: Franz Hillingrathner, Junkersdorf near Cologne, Germany
[73] Assignee: International Harvester Company, Chicago, Ill.
[22] Filed: Aug. 26, 1970
[21] Appl. No.: 66,949

[52] U.S. Cl..................74/604, 74/443, 123/192 B
[51] Int. Cl......................................F02b 75/06
[58] Field of Search............74/604, 443; 123/192 B, 192 R

[56] References Cited

UNITED STATES PATENTS

| | | | |
|---|---|---|---|
| 2,914,964 | 12/1959 | Bensinger et al. | 74/604 |
| 3,257,860 | 6/1966 | Runde et al. | 74/443 X |
| 1,163,832 | 12/1915 | Lanchester | 123/192 B |
| 2,914,137 | 11/1959 | Sykes, Jr. | 74/604 X |

FOREIGN PATENTS OR APPLICATIONS

| 1,091,338 | 4/1955 | France | 74/443 |
|---|---|---|---|

*Primary Examiner*—William F. O'Dea
*Assistant Examiner*—F. D. Shoemaker
*Attorney*—Floyd B. Harman

[57] ABSTRACT

A balancer for an engine having a crankshaft including a gear connected to and driven by the crankshaft, and a pair of meshing pinions connected to and driving a pair of counter-rotating weights, one of the pinions meshing with the gear. The gear has a ring and a hub with projections on each and an elastic material interposed to isolate the crankshaft from vibrations caused by the rotation of the weights.

3 Claims, 3 Drawing Figures

PATENTED JUN 6 1972          3,667,317

Inventor:
Franz Hillingrathner
By Ronald C. Kamp
                    Atty.

BALANCER

BACKGROUND AND SUMMARY OF THE INVENTION

In order to compensate for inertia forces in internal combustion engines, it has been common practice to provide various masses or weights arranged eccentric to the axis of rotation of the crankshaft or to an axis parallel therewith. These masses themselves cause intermittent loads on the crankshaft resulting from the large acceleration and deceleration forces created by changes in the direction of movement of the weights or masses. In those cases where the masses are not mounted on the crankshaft itself, but are mounted to a shaft driven by the crankshaft at twice the speed thereof, torsional vibrations occur in the driving gear which creates a severe noise problem in addition to imposing loads exceeding a multiple of the normal load. One of the reasons for these vibrations and noises is the large backlash in the gears, which in part depends on the maximum play permitted in the crankshaft.

It is therefore an object of this invention to provide a means for reducing the noise and the peak loads in the drive means for the balancing masses driven by the crankshaft.

It is also an object of this invention to provide a means for reducing the backlash in the drive means for the balancer of an internal combustion engine.

It is a further object of this invention to provide a means for elastically dampening torsional vibrations imposed upon a crankshaft by an engine balancer.

It is still another object to provide a means for limiting the radial movement of the driving gear for a balancer while simultaneously permitting tangential movement of the driving gear relative to the crankshaft in order to reduce backlash and prevent failures.

These and other objects of the present invention, and many of the attendant advantages thereof, will become more readily apparent upon a perusal of the following description and the accompanying drawings, wherein:

FIG. 2 is a cross sectional view taken on line II—II in FIG. 1; and

FIG. 3 is an enlarged view of a preferred embodiment for the driving gear ring associated with the crankshaft.

DESCRIPTION OF A PREFERRED EMBODIMENT

Figure 1:
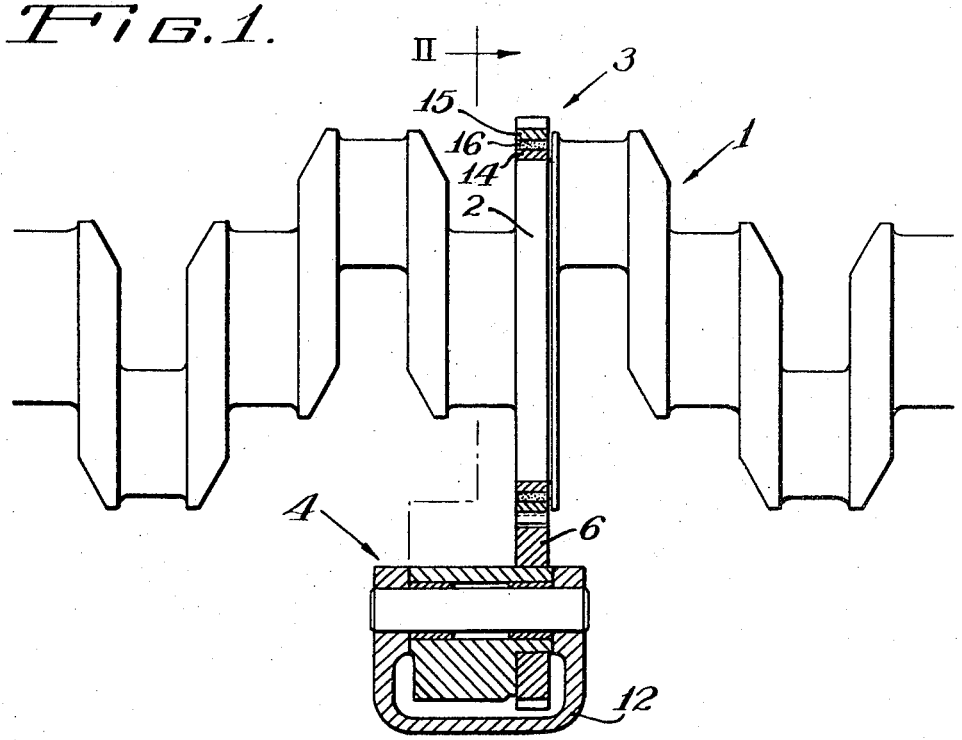
FIG. 1 is a side elevational view of a crankshaft, with portions in section, incorporating the present invention.
Figure 1:
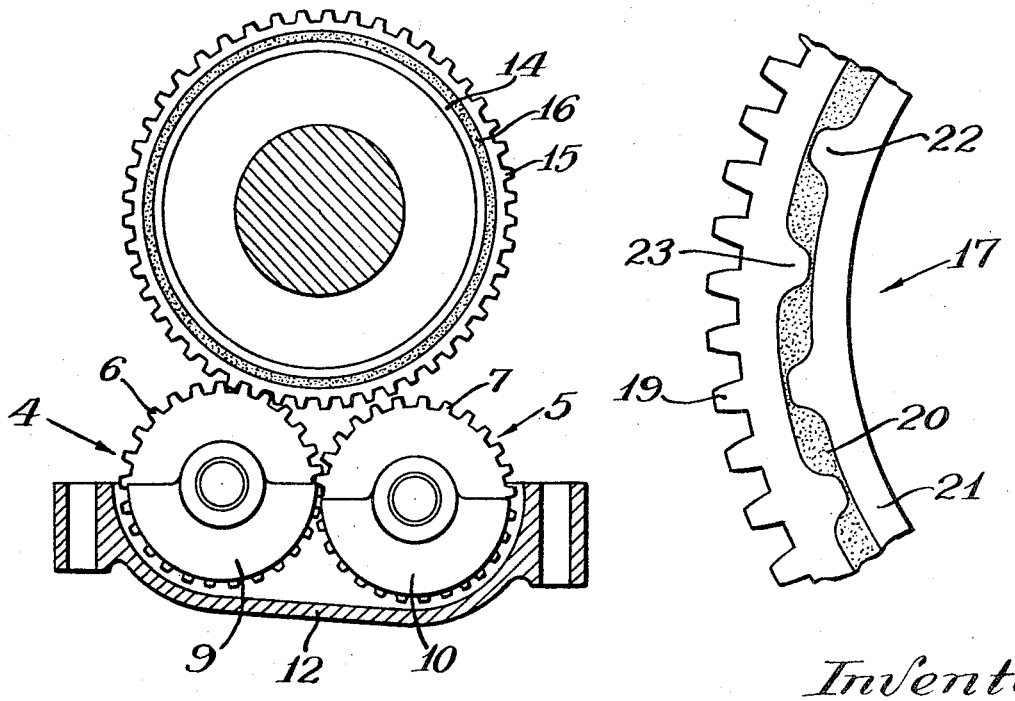

Referring now to FIG. 1, there is shown a crankshaft 1 having a web 2 with a ring gear 3 connected with the web or hub 2. A pair of balancers 4 and 5 are rotatably mounted in a housing 12 fitted under the crankshaft 1. The balancer 4 includes a pinion 6 which is rotatably mounted on a pin within the housing 12 and has a weight or mass 9 connected with the pinion 6 and rotates therewith. The balancer 5 has a configuration identical with the balancer 4 and includes a pinion 7 mounted for rotation within the housing 12 and a mass 10 connected to the gear 7 for rotation therewith. The pinion 6 meshes with the ring gear 3 and with the pinion 7.

Ring gear 3 is provided with a hub 14 and a toothed rim 15 with a rubber ring 16 vulcanized to the hub and the rim. This ring 16 serves as a torsionally elastic layer. The eccentrically arranged masses 9 and 10 of the balancers 4 and 5 cause a torsional vibration in the teeth of the rim 15, which causes load peaks higher than those encountered in a normal gear drive. The torsional elastic layer reduces this torsional vibration and hence reduces the surface load on the teeth. The torsional elastic part may, of course, also be arranged between the teeth and the hub of the gear 6.

Referring now to the embodiment shown in FIG. 3, the ring gear 17 includes a toothed ring 19 and a hub 21 each of which are provided with dogs or projections 22 and 23 between which rubber elements 20 are arranged. The projections 22 on the hub 21 extend radially outward into contact with the toothed rim 19 and the projections 23 on the rim 19 project radially inward into contact with the hub 21. The rubber elements 20 are positioned between the alternating projections 22 and 23 and hence when the rim 19 is rotated relative to the hub 21 no shearing stress is imposed upon the rubber elements. By making the projections 22 and 23 contact the rim and hub respectively, radial movement of the rim 19 relative to the hub 21 is precluded. Elimination of radial movement of the rim relative to the hub will insure that the teeth on the rim 19 and the gear 6 are always in proper engagement and tip loading of the teeth will be eliminated. In addition, precluding the radial movement of the rim will assist in reducing the backlash in the teeth on the pinion 6 and the rim 19.

While a preferred form of the invention has been disclosed herein, it is to be understood that various changes and modifications may be made therein without departing from the spirit of the invention as defined by the scope of the accompanying claims.

What is claimed is:

1. A balancer for an engine having a crankshaft, comprising:
  a first gear means driven by the crankshaft;
  a second gear means meshing with the first gear means and driven thereby;
  a third gear means meshing with the second gear means and driven thereby;
  a balancing weight connected to and driven by each of the second and third gear means;
  one of said first and second gear means having ring and hub portions;
  torsionally elastic means interposed between said ring and hub portions to isolate the crankshaft from torsional vibrations created by said balancing weights; and
  limiting means carried by at least one of said ring and hub portions to preclude radial movement of the ring portion relative to the hub portion.

2. The invention according to claim 1, wherein: said limiting means includes a plurality of projections formed on said one portion and projecting toward and contacting the other portion.

3. The invention according to claim 1, wherein:
  said limiting means comprises a plurality of projections formed on both of said ring and hub portions;
  said projections on each portion spaced between and directed toward and contacting the other portion; and
  said elastic means bonded to the portions and filling the space therebetween.

* * * * *